United States Patent [19]

Javes et al.

[11] 4,081,645

[45] Mar. 28, 1978

[54] TEMPERATURE CONTROLLED MICROWAVE OVEN

[75] Inventors: Wallace Raymond Javes; Calvin Andre Hagberg; Harold Coulston Anderson, all of Minneapolis, Minn.

[73] Assignee: Litton Systems, Inc., Beverly Hills, Calif.

[21] Appl. No.: 627,146

[22] Filed: Oct. 30, 1975

[51] Int. Cl.² .............................................. H05B 9/06
[52] U.S. Cl. .............................. 219/10.55 B; 73/352; 219/10.55 E; 219/516; 340/228 R
[58] Field of Search ............ 219/10.55 E, 10.55 B, 219/10.55 C, 10.55 M, 506, 510, 513, 516; 338/27, 28; 337/306, 312, 326, 332; 236/86, 99; 340/228 R, 229, 227 R, 227 C; 73/344, 345, 352, 353, 362 AR, 362.1, 368.3, 368.4; 99/342, 348, 337, 421 TP, 329

[56] References Cited

U.S. PATENT DOCUMENTS

| | | | |
|---|---|---|---|
| 2,103,513 | 12/1937 | Campbell | 73/352 UX |
| 2,820,130 | 1/1958 | Dadson | 219/516 X |
| 2,858,699 | 11/1958 | Scofield et al. | 73/352 |
| 2,890,429 | 6/1959 | Baker | 338/28 |
| 2,914,644 | 11/1959 | Holtkamp | 219/516 X |
| 2,933,585 | 4/1960 | Holtkamp | 219/516 X |
| 2,963,566 | 12/1960 | Ross et al. | 219/516 X |
| 3,003,048 | 10/1961 | Scott | 99/421 TP |
| 3,062,943 | 11/1962 | Euler | 99/421 TP |
| 3,081,695 | 3/1963 | Mathis | 99/421 TP |
| 3,089,407 | 5/1963 | Kinkle | 99/421 TP X |
| 3,159,033 | 12/1964 | Salmon | 73/368.3 |
| 3,177,319 | 4/1965 | Komatsu | 337/312 X |
| 3,180,149 | 4/1965 | Woods | 73/368.3 X |
| 3,194,009 | 7/1965 | Baker | 73/368.3 X |
| 3,212,709 | 10/1965 | Hanssen | 219/516 X |
| 3,241,370 | 3/1966 | Mertler et al. | 73/352 |
| 3,259,056 | 7/1966 | King | 219/516 X |
| 3,511,167 | 5/1970 | Holtkamp | 73/352 X |
| 3,611,336 | 10/1971 | Chen | 73/352 X |
| 3,849,622 | 11/1974 | Merriam | 219/10.55 E |
| 3,931,620 | 1/1976 | Wellman et al. | 73/352 X |
| 3,974,696 | 8/1976 | Fitzmayer | 219/10.55 E X |
| 3,975,720 | 8/1976 | Chen et al. | 219/10.55 E X |

*Primary Examiner*—Arthur T. Grimley
*Attorney, Agent, or Firm*—Robert E. Lowe

[57] ABSTRACT

The power supplied to the cooking cavity of a microwave oven is controlled in response to a preselected temperature of food placed therein. A temperature responsive probe is embedded in the food to be cooked, the probe including means for changing its state with variations in temperature.

4 Claims, 5 Drawing Figures

TEMPERATURE CONTROLLED MICROWAVE OVEN

BACKGROUND OF THE INVENTION

Microwave ovens have become a well-known household cooking appliance. Such appliances represent a variety of advantages to the user, not the least of which is the relative speed with which cooking can be accomplished. While such speed in on the one hand an advantage, it can be at the same time a disadvantage in that a fairly small error in cooking time can result in an unacceptably underdone or overdone food product.

Heretofore cooking in a microwave oven has been primarily controlled through the control of time. Microwave ovens include some sort of timer wherein a given time in minutes and seconds is chosen as appropriate for the food type and quantity to be cooked. Such times can be selected on the basis of cookbooks, or on the basis of experience based upon trial and error.

However, the usual object in cooking food is to bring the food to some state of doneness. The doneness of food is not generally measured in terms of time of cooking, but is far more commonly measured in terms of the internal temperature of the food. Therefore, microwave ovens which are controlled solely on the basis of time require considerable instruction to the user in order to allow the user to make the necessary conversion from temperature of the food to the time required to reach that temperature.

It can therefore be understood that it would be highly advantageous to provide a microwave oven in which the oven can be controlled directly through the temperature of the food being cooked without regard to the elapsed time factor. Various schemes have been suggested in the prior art in an effort to develop such an oven, but because of inherent disadvantages in such prior art suggestions ovens incorporating them have not found wide commercial acceptance.

One such class of techniques involves the measurement of various parameters of the air surrounding the food. For example, it has been suggested to measure the humidity of the air in the cooking cavity, or of the gases exhausted therefrom, on the theory that the water vapor given off by the cooking food indicates a relative measurement of temperature. Other schemes have suggested measuring the temperature of the exhaust gases as an indication of the temperature of the food itself. The clear disadvantage of these techniques is the fact that the control parameter is something other than the temperature of the food itself, although it may be somewhat related to the food temperature. However, since the degree of doneness is to be determined by the temperature of the food itself, techniques which do not involve the direct measurement of that temperature suffer from inherent inaccuracies.

Another class of techniques that have been suggested is the use of sonic waves and the acoustics of the cooking chamber to sense the presence of moisture in the air. Clearly this type of technique incorporates the same kinds of disadvantages found in the humidity measurement techniques discussed previously.

It has also been suggested to control the cooking by placing a small amount of some type of material in addition to the food into the cooking cavity, the additional material being directly connected to the control circuit. Again, the approach is to measure a parameter other than the temperature of the food itself and to attempt to extrapolate from that quantity to the food temperature.

It also has been suggested to provide a thermometer for insertion into the food product, which thermometer may be constructed of nonconductive materials with nonconductive expansible fluid therein. However, such a thermometer is capable only of indicating the temperature of the food product, but is not capable of exercising any direct control over the power supplied to the cavity. Therefore, the user must pay constant attention to the thermometer and manually terminate the application of power upon reaching the desired temperature.

It is therefore an object of the present invention to overcome the shortcomings of the prior art techniques and to provide a means for controlling the power supplied to a microwave oven directly in response to the temperature of the food being cooked in the oven.

A further object of the present invention is to provide a temperature responsive means of controlling a microwave oven whereby the power supplied to the oven may be automatically terminated upon the reaching of a preselected temperature of the food product.

Yet another object of the present invention is to provide a temperature responsive probe insertable into a foodstuff to be cooked in a microwave oven, which probe is adapted to provide a signal to interrupt the application of microwave power upon reaching a predetermined temperature.

Yet another object of the present invention is to provide a temperature responsive food probe useable in a microwave environment and which is capable of transmitting a signal in response to a change of state of the probe conditioned upon its temperature.

SUMMARY OF THE INVENTION

The present invention provides a probe which is insertable into the foodstuff to be cooked, the probe being of a type that undergoes a change of mechanical or electrical state in response to temperature changes. The change of state of the probe generates an input to the oven control circuit, causing the oven to shut off when the foodstuff reaches a preselected temperature.

The temperature probe may be composed of conductive or nonconductive material. In a preferred form of the invention, the probe includes a thermistor that is electrically connected to the oven control circuit.

DESCRIPTION OF THE DRAWINGS

The invention will be described in more detail by reference to the drawings in which.

DESCRIPTION OF PREFERRED EMBODIMENTS

Figure 1:
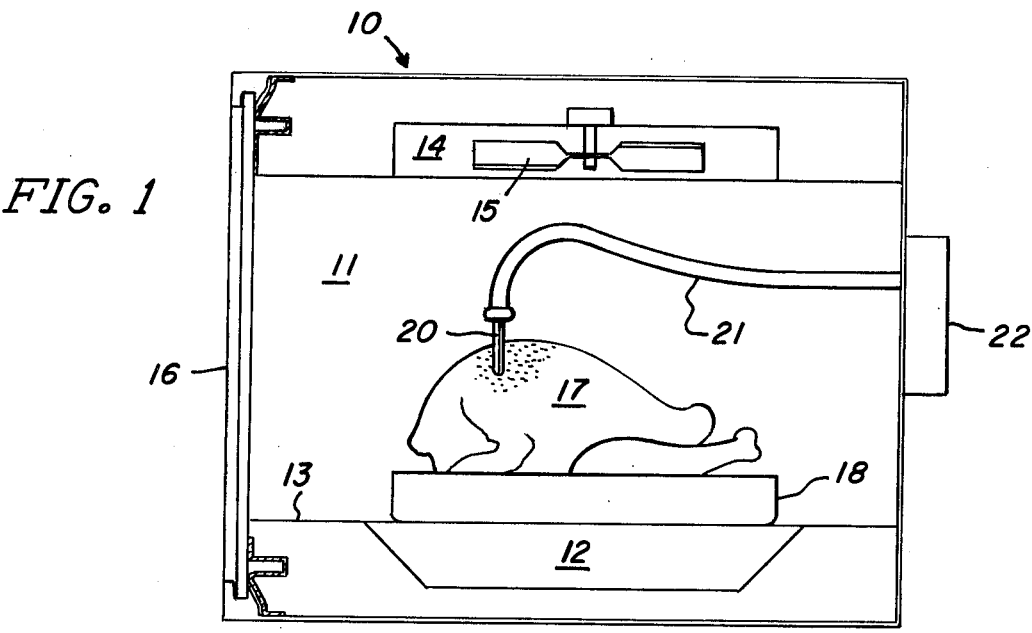
FIG. 1 is a front view in elevation, partially in section, showing a microwave oven with a probe inserted in a foodstuff positioned in the oven.

As is illustrated in the drawings, the present invention includes a microwave oven 10 having a cooking cavity 11, which includes a recessed portion 12 covered by a microwave nonabsorptive shelf 13. Microwave energy is provided by a source such as a magnetron (not shown) and introduced into cooking cavity 11 through feed box 14. A stirrer 15 may be positioned in feed box 14 to aid in establishing an even pattern of microwave energy within cavity 11. Door 16 extends across the front of cavity 11 to complete the enclosure.

For purposes of illustration, there is depicted a foodstuff 17 positioned within the oven on a suitable cooking dish 18. Embedded in the foodstuff is a temperature probe 20 which is in turn connected to a control assembly 22 located outside of cooking cavity 11 through conduit 21.

In practice the probe 20, conduit 21, and control assembly 22 may take various configurations although each incorporates the common principle of a probe that is temperature responsive and is capable of generating a temperature dependent mechanical, electrical or electronic signal to control the operation of oven 10.

Figure 2:
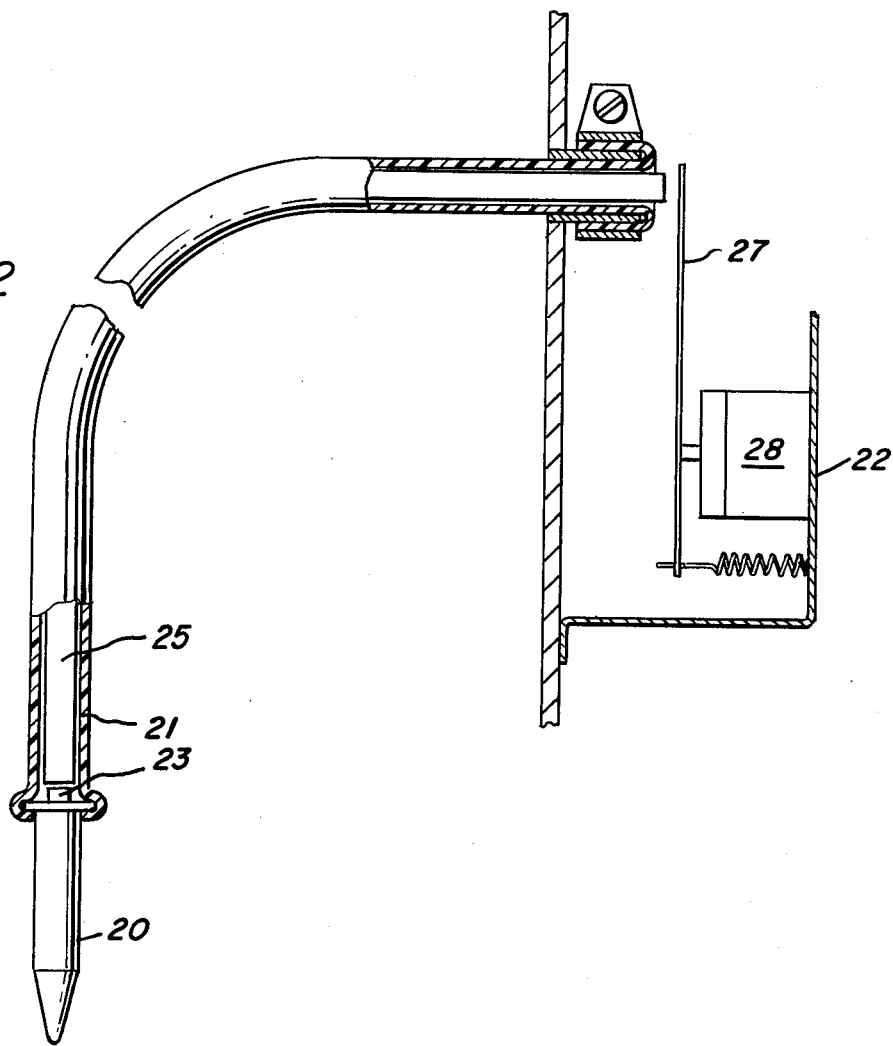
FIG. 2 is an enlarged diagrammatic view of a type of nonconductive probe suitable for the invention.

It is well-known that metal is generally reflective of microwave energy, and the use of metal in microwave ovens has long been discouraged. In some microwave oven cavities extraneous metal can seriously disrupt the cooking pattern, may cause arcing and burning of the side walls of the cavity, and can cause excessive leakage of microwave energy depending upon the door design. The embodiment shown in FIG. 2 is especially adapted for use when metal is to be avoided.

Probe 20 may be manufactured from a variety of nonmetallic non-microwave absorptive materials such as various plastic materials. Contained within probe 20 is an expansible, non-lossy fluid and a slideable piston 23. As the fluid expands as a result of heat from the foodstuff, piston 23 is driven upwardly out of the housing of probe 20. A non-lossy, flexible conduit 21 connects probe 20 to the oven wall and the exterior mounted control assembly 22. Push rod 25 is housed within conduit 21 with sufficient clearance from the sidewalls of the conduit to allow rod 25 to slide within the conduit without substantial resistance. Rod 25 is preferably manufactured from a non-lossy plastic material which is flexible along its length but is rigid in response to forces applied directly at either end.

In operation, the end piston 23 engages the end of rod 25 as the fluid in probe 20 expands, pushing rod 25 through conduit 21 into contact with lever 27 of control assembly 22. As lever 27 is moved to the right, it in turn engages relay switch 28 which is wired into the oven power supply circuit. The closing of switch 28 terminates power to the oven to end the cooking cycle.

The continuing development and improvement of microwave ovens has provided ovens having much improved matching characteristics between the power supply, the microwave feed system, and the cooking cavity. These improvements have to some extent mitigated the earlier difficulties associated with the use of metal in the oven. Consequently, it has been found that temperature probes of largely metal construction can be used successfully in a microwave oven environment.

Figure 5:
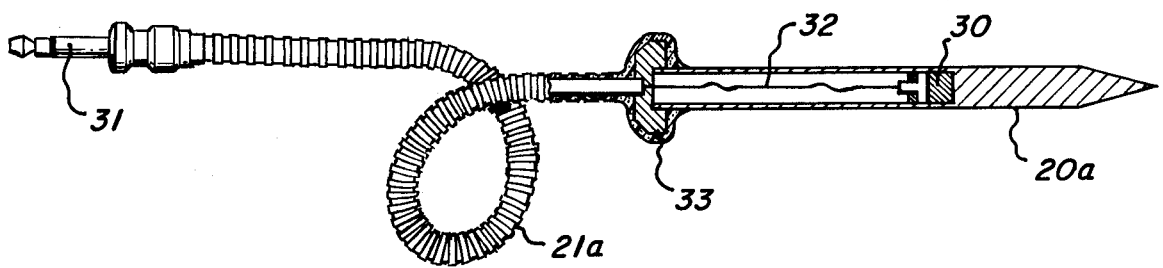
FIG. 5 is a detailed view, partially in section of another form of probe suited to the invention.

FIG. 5 is illustrative of one such probe and forms a portion of a preferred embodiment of the present invention. The probe includes a probe casing 20a which houses a thermistor 30. Attached to probe 20a is a flexible conduit 21a having a plug or jack 31 at its opposite end. Electrical lead 32 connects thermistor 30 with jack 31. An outer coating 33 covers the upper portion of probe 20a, conduit 21a, and a portion of jack 31. The coating is preferably a room temperature vulcanized (RTV) rubber composition although other suitable compositions can be substituted.

The coating serves several useful purposes. Since it is a waterproof material, it provides insulation for the electrical leads within conduit 21a from moisture, grease and the like, adding to the reliability and useful life of the probe mechanism. Moreover, the coating reduces the sensible heat transfer from the probe mechanism, so that the probe feels cooler to the touch after use in the oven.

Figure 3:
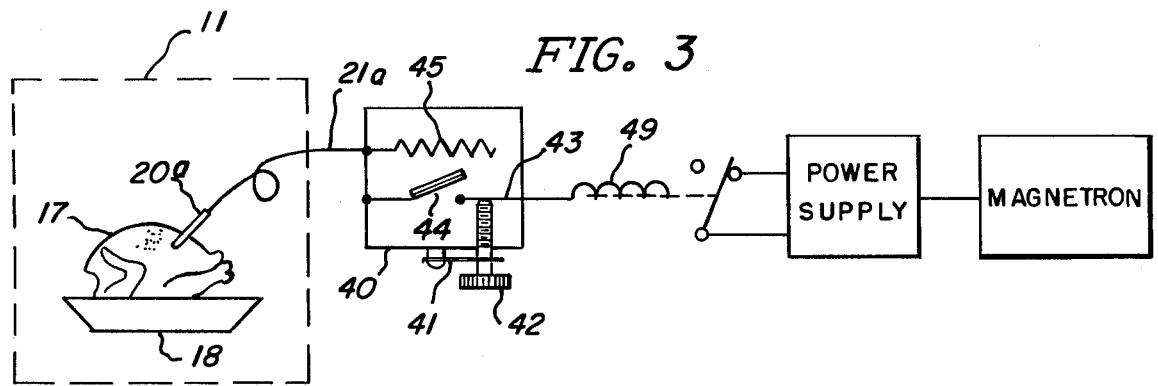
FIG. 3 is a diagrammatic view of a control circuit for a microwave oven including means for control by a temperature responsive probe.

Thermistor 30 has the known characteristic of changing its electrical resistance in response to temperature changes. Jack 31 is inserted into a suitable receptacle in the wall of cavity 11, electrically connecting it to the circuitry of control assembly 22. That circuitry is illustrated in FIG. 3. A suitable dial 40 is provided having a pointer 41 and a set knob 42 for positioning the pointer at a preselected temperature. The rotation of the dial positions contact 43 in relationship to bimetal strip 44. Upon heating of resistance 46, the bimetal strip 44 moves toward contact 43. The voltage applied to resistor 45 is in turn controlled by the resistance of thermistor 30.

As the resistance of thermistor 30 decreases with increased temperature, increased voltage is supplied to resistor 45 allowing greater heating and hence greater displacement of bimetal 44. By simply calibrating the distance between bimetal strip 44 and contact 43 to correspond to the rate of change of resistance of thermistor 30, a scale can be produced corresponding to the temperature of the food product in the oven. Pointer 41 can then be set to the desired temperature and the power to the magnetron is terminated when that temperature is reached through the action of coupling relay switch 49 between the probe control circuit and the oven power circuit.

Figure 4:
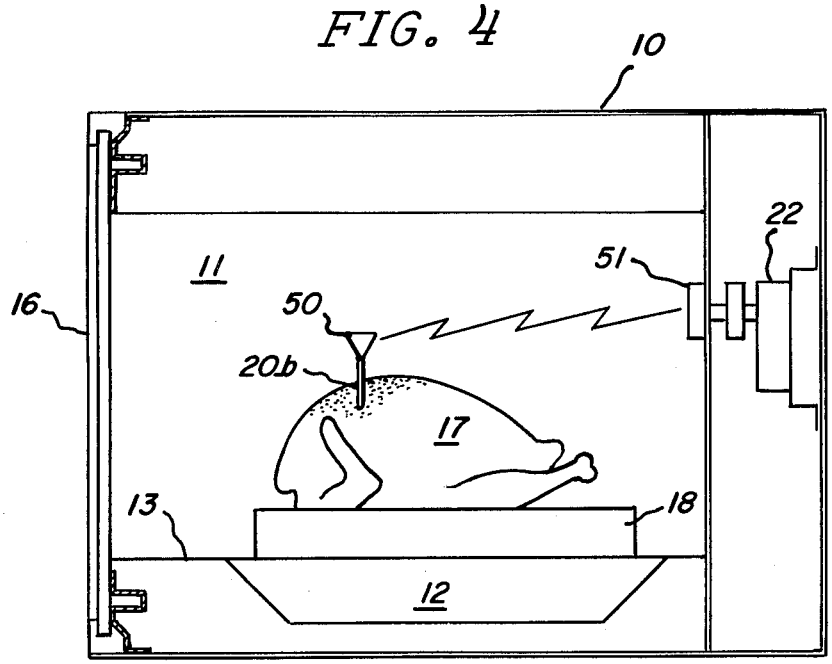
FIG. 4 is a front view in elevation, partially in section, showing another form of probe suitable for the invention.

Yet another type of temperature probe is illustrated in FIG. 4, in which the probe is designed to operate without a direct physical connection between the probe and oven. Instead, the output of a thermistor in the tip of the probe may be coupled to an integrated circuit transmitter 50 positioned at the upper end of probe 20b, the circuit 50 being of the type having an output signal frequency which is dependent upon the change in resistance of the thermistor. An antenna 51 is positioned in cavity 11 to receive the signal and transmit it to control assembly 22, which may include one or more crystals or other frequency sensitive devices, the activation of which controls relay 49 to terminate operation of the oven as has been previously described.

Thus it can be seen that the present invention provides for the direct measurement of the temperature of a foodstuff or other material to be heated in a microwave environment, and for controlling the microwave power source to terminate it when the selected temperature has been reached. While the invention has been described in detail, such detail is intended to be illustrative and not by way of limitation. Other modifications can be made by those skilled in the art without departing from the spirit of the invention, which invention is defined in the appended claims.

We claim:
1. In combination:
   A microwave oven including an oven cavity;
   a microwave energy source coupled to supply microwave energy to said cavity;

a temperature probe adapted to be embedded into a material to be heated in said cavity, said probe including a metal tube portion having a thermistor contained therein, a plug portion adapted for connection to a receptacle provided in a wall of the oven cavity, and a flexible metal conduit portion interconnecting said tube and plug portions and incorporating an electrical lead from said thermistor to said plug portion;

control means electrically connected to said probe including means for selecting a temperature, said control means being arranged in the electrical circuit of said microwave energy source whereby said source is interrupted when the temperature of said probe reaches said selected temperature; wherein said conduit portion is encased in a flexible, non-metallic coating having a lower sensible heat transfer rate than the underlying metal.

2. The combination of claim 1 wherein said coating extends over the entire length of said conduit portion and the adjacent ends of each of said tube and plug portions.

3. The combination of claim 1 wherein said coating is a room temperature vulcanized rubber.

4. The combination of claim 2 wherein said coating is a room temperature vulcanized rubber.

* * * * *